3,089,884
PREPARATION OF ESTERS
David W. Marshall, Ponca City, Okla., assignor to Continental Oil Company, Ponca City, Okla., a corporation of Delaware
No Drawing. Filed Dec. 21, 1961, Ser. No. 161,308
8 Claims. (Cl. 260—410.9)

This invention relates to an improved process for the preparation of alkyl esters of monocarboxylic acids. More particularly, the present invention concerns a process for the preparation of an alkyl ester of a 1-alkane carboxylic acid comprising reacting a trialkyl aluminum compound with an alkyl chloroformate. The invention further relates to a method for preparing dialkyl aluminum chlorides.

The present invention provides a novel method for the preparation of commercially important monoesters. Additionally, the instant process provides an improved method for obtaining valuable intermediate and higher molecular weight fatty acids ranging in carbon atom lengths from 5 to about 20. The esters derived in accordance with this invention find wide application in the chemical industry and exhibit particular usefulness as plasticizers for many thermoplastic polymers. The monobasic acids to which the products of this process can be readily converted as well as the esters themselves find usefulness in the preparation of synthetic resins and other types of condensation products.

To the best of my knowledge, this invention represents only the second implementation of the principles or organo-aluminum chemistry in order to prepare carboxylic acids or their derivatives. Heretofore, it has been taught that a trialkyl aluminum compound can be reacted with carbon dioxide under certain conditions to yield an aluminum salt which can then be hydrolyzed to form the corresponding acids. My invention, however, fundamentally differs from this prior art teaching. Furthermore, there are several practical advantages which are evident since the instant process does not require high pressure conditions. Consequently, the present process can be expeditiously carried out to provide better yields and purer products than that obtained in the prior art process.

I have found by the present invention a novel manner of preparing alkyl esters of monocarboxylic acids and particularly those of straight chain acids. In accordance with my process, readily obtainable alkyl aluminum compounds are reacted with an alkyl chloroformate, which reaction readily results in the formation of the desired ester in excellent yields. Complete details with respect to the reaction involved and applicable conditions will be given after first presenting a description of the aluminum compounds useful in the practice of this invention together with a brief discussion of how they may be obtained.

The stated aluminum compounds can be easily derived by reacting either triethyl aluminum or tripropyl aluminum with ethylene under conditions so as to induce the well known growth reaction. This growth reaction is depicted schematically by the following equation in which triethyl aluminum is illustratively set forth as the starting aluminum compound:

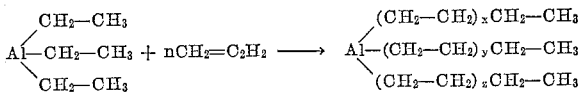

where $x$, $y$ and $z$ is an integer ranging up to about 50 and where $x+y+z=n$.

The reaction in accordance with the above equation can be conveniently carried out by continuously introducing the ethylene into the triethyl aluminum preferably in the presence of a nonreactive diluent capable of dissolving the reactants. A wide variety of reaction conditions can be utilized to accomplish the growth reaction. For example, a temperature within the range of about 65 to 150° C. and a pressure within the range of from about 200 to 5000 p.s.i. can be used. More preferable limits of these respective conditions include a temperature range of from 90 to 120° C. and a pressure range from about 1000 to 3500 p.s.i.

The product of the growth reaction is a complex mixture of various aluminum trialkyls wherein the composition of the alkyl moiety follows a statistical distribution known as the Poisson distribution. Generally, in such a distribution, the alkyl content will be peaked at about $2m+2$ carbon atoms where $m$ (usually referred to as "$m$ value") is the mean number of additions of ethylene. The addition of the ethylene during the growth reaction is controlled by regulating the amount of total ethylene introduced into the reaction sphere.

The products of the above-described growth reaction can be used as such in the practice of my process. When using a growth product, the resultant ester product will comprise a mixture of esters wherein the alkyl substituents of the carbonyl groups present substantially correspond to the statistical distribution observed for the growth product employed. The mixture of esters can then be readily fractionated to any extent desired. It is, of course, obvious that when triethyl aluminum is used in the growth reaction, the resultant growth product will contain only even numbered carbon atoms. Where it is desired to obtain aluminum alkyls containing an odd number of carbon atoms, one can employ tripropyl aluminum as the starting material.

Before leaving the subject of growth products, it is noteworthy to mention that such products derived by observing a "$m$ value" in the range of from 2 to 6 are particularly useful in preparing the esters in accordance with the instant process. Depending on the precise "$m$ value" used, growth products will be obtained containing substantial amounts of alkyl groups ranging in carbon atom lengths from 4 to 20.

An alternative way of preparing aluminum alkyl compounds useful herein, including the various aluminum trialkyls, consists of reacting aluminum (tri-isobutyl) with an alpha olefin. This reaction is preferably carried out in three stages whereby the aluminum (tri-isobutyl) is successively converted to the monohydride form with the evolution of isobutylene followed in each instance by reaction of the monohydride with the alpha olefin. While this stage-wise procedure is preferred, it is nevertheless mentioned that a U.S. Patent No. 2,835,689 discloses a method for directly converting the tri-isobutyl aluminum. In preparing aluminum alkyl compounds in this manner, any alpha olefin can be used, but it is preferred to employ those olefins wherein the terminal double bond is connected to either a primary or secondary carbon atom. Specific types of such olefins include: the straight chain olefins, e.g., 1-octene; branch chain olefins, e.g., 2-ethyl-1-hexene; cyclic substituted olefins, e.g., styrene, vinylcyclohexene and the like.

The reaction underlying the process of this invention can be expressed diagrammatically as follows:

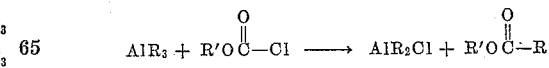

This reaction can be effectively carried out over the temperature range of from about 0 to 200° C. Atmospheric pressure is generally observed, although super- and sub-atmospheric conditions are applicable. The reaction is an exothermic one so, consequently, it is desirable to conduct same where cooling can be observed if needed.

A preferred temperature range is from about 0 to 50° C. The process is best facilitated by adding the aluminum trialkyl to a solution of alkyl chloroformate. The presence of the solvent is desirable, particularly when carrying out the reaction within the preferred temperature range. Suitable solvents include any one of a number of normal paraffins or ether. Of the normal paraffins, hexane is particularly useful for this purpose.

The reaction medium is desirably agitated during the addition of the trialkyl aluminum and for a brief period subsequent thereto. Suitable relative proportions of aluminum alkyl to alkylchloroformate range from about 1:1 to 1:3, respectively, on a molar basis. While not essential, it is nevertheless preferred to maintain the mixture under reaction conditions for a time following the addition of the aluminum alkyl ranging from about one-half to several hours.

In common with many other double decomposition-type reactions involving the use of a trialkyl aluminum as a reactant, substantially only one of the alkyl groups is readily replaceable. I am not aware at present of any conditions which will significantly induce the reaction of the remaining alkyl groups associated in the aluminum compound. However, this limitation poses no real economic disadvantage as the spent dialkyl aluminum chloride can be readily converted to the alkoxide form which upon hydrolysis yields the corresponding alcohols. Additionally, the dialkyl aluminum chlorides per se are useful. For example, they represent effective polymerization catalysts. In those instances where the process of this invention is practiced with the primary objective of obtaining dialkyl aluminum chlorides, the employment of the lower alkyl aluminum compounds therein is especially beneficial. As specific examples of such aluminum compounds there are: triethyl aluminum, tripropyl aluminum, tributyl aluminum, etc.

The ester can be recovered from the reaction mixture by vacuum distillation. Alternatively, of course, the reaction mixture can be mildly hydrolyzed and the ester separated from the hydrolysis mixture by fractionation.

As mentioned above, in most instances it will be desirable to further oxidize the dialkyl aluminum chloride in order to prepare the dialkoxide. The oxidation procedure applicable for achieving the foregoing is conventional in the art and generally consists of bubbling oxygen or air through the dialkyl aluminum chloride, or more preferably, an inert hydrocarbon solution thereof, until the alkyl radicals are substantially completely converted to the alkoxide form. The temperatures that can be used in the oxidation procedure ordinarily range from 0–90° C. but somewhat higher temperatures can also be used. The oxidation may be carried out at atmospheric or super-atmospheric pressures.

The oxidized product can be easily hydrolyzed in order to prepare the alcohol corresponding to the alkoxide group. Any one of a number of hydrolyzing agents can be used for this purpose. Representative of such agents include: hydrochloric acid, sulfuric acid, nitric acid, sodium hydroxide, potassium hydroxide, etc. These agents are added to the oxidized product in the form of aqueous solutions. Following the hydrolysis reaction, the mixture can then be steam-stripped of the alcohol whereupon the alcohol-containing distillate is permitted to stand to yield an aqueous phase and an alcohol-(solvent) layer.

The alkyl chloroformates useful in the practice of this invention can be readily obtained by reacting phosgene with either a straight or branched chain aliphatic alcohol. Thus, the alcohols derived through the oxidation of the dialkyl aluminum chlorides in accordance with the above can be converted to the corresponding chloroformates which in turn can be employed to prepare esters by my process. The nature of the alkyl substituent of the chloroformate has no discernible effect upon the reaction underlying the present process. Accordingly, any alkyl chloroformate can be used. However, it is envisioned that the most useful esters will be derived using alkyl chloroformates wherein the alkyl substituent contains from 2 to about 20 carbon atoms. Where the ultimate object is that of preparing a carboxylic acid, one would obviously select the less expensive lower alkyl chloroformates. For this purpose, the lower alkyl chloroformates such as methyl chloroformate, ethyl chloroformate, propyl chloroformate and butyl chloroformate are especially applicable.

In those instances where the ester itself is desired as the ultimate product, the selection of the alkyl chloroformate will be dependent upon the particular end use contemplated for the ester so prepared.

In order that the present invention may be more fully understood, the following specific example is set forth. This example is given primarily by way of illustration and any enumeration of details contained therein should not be interpreted as limitations except as indicated in the appended claims. All parts are parts by weight unless otherwise stated.

*Example*

Into a suitable reaction vessel equipped with a thermometer, stirrer, and means for cooling the contents of the reactor, were charged 14.7 parts of ethyl chloroformate and 66 parts of n-hexane. Stirring was commenced whereupon aluminum (tri-n-octyl) in the amount of 18.3 parts was slowly added at a uniform rate to the reaction vessel. The aluminum compound was added over a period of 2 hours. During this addition, the temperature was maintained between 25° and 35° C. Upon completion of the addition of the aluminum alkyl, the reaction mixture was poststirred at room temperature for two hours. The reaction mixture was then carefully hydrolyzed using dilute hydrochloric acid. The hydrocarbon layer resulting upon hydrolysis was separated, dried and then analyzed. The analysis data showed that 24.5% of the octyl groups of the aluminum trioctyl reacted to form ethyl nonanoate.

I claim:
1. A process for preparing an alkyl ester of a 1-alkane carboxylic acid which comprises reacting an aluminum trialkyl having alkyl substituents containing not in excess of about 50 carbon atoms with an alkyl chloroformate at a temperature between about 0° and 200° C.

2. A process for preparing a mixture of an alkyl ester of a 1-alkane carboxylic acid and a dialkyl aluminum chloride which comprises reacting an aluminum trialkyl having linear alkyl substituents containing from 2 to 20 carbon atoms with an alkyl chloroformate at a temperature between about 0° and 200° C.

3. A process for preparing an alkyl ester of a straight chain monocarboxylic acid which comprises reacting one mole of an aluminum trialkyl having linear alkyl substituents containing from 4 to 20 carbon atoms with from about one to three moles of an alkyl chloroformate wherein the alkyl substituent contains from 2 to 20 carbon atoms at a temperature between about 0° and 200° C.

4. A process for preparing a lower alkyl ester of a 1-alkane carboxylic acid which comprises reacting one mole of an aluminum trialkyl having alkyl substituents containing from 4 to 20 carbon atoms with from about one to three moles of an alkyl chloroformate wherein the alkyl substituent contains from 1 to 4 carbon atoms at a temperature between about 0° and 50° C.

5. A process for preparing a lower alkyl ester of a straight chain monocarboxylic acid which comprises reacting one mole of an aluminum trialkyl having linear alkyl substituents containing from 4 to 20 carbon atoms with from about one to three moles of an alkyl chloroformate wherein the alkyl substituent contains from 1 to 4 carbon atoms at a temperature between about 0° and 50° C.

6. A process for preparing the methyl ester of a straight chain monocarboxylic acid which comprises reacting one mole of an aluminum trialkyl having linear alkyl substituents containing from 4 to 20 carbon atoms with from about one to three moles of methyl chloroformate at a temperature between about 0° and 50° C.

7. A process for preparing the ethyl ester of a straight chain monocarboxylic acid which comprises reacting one mole of an aluminum trialkyl having linear alkyl substituents containing from 4 to 20 carbon atoms with from about one to three moles of ethyl chloroformate at a temperature between about 0° and 50° C.

8. A process for preparing ethyl n-nonanoate which comprises reacting one mole of aluminum (tri-n-octyl) with from about one to three moles of ethyl chloroformate at a temperature between about 0° and 50° C.

No references cited.